US006568418B1

(12) United States Patent
Hope et al.

(10) Patent No.: US 6,568,418 B1
(45) Date of Patent: May 27, 2003

(54) PRECISION REGULATOR

(75) Inventors: Rodney C. Hope, Sugar Land, TX (US); Thomas W. Neugebauer, Houston, TX (US); Richard R. Watson, Missouri City, TX (US)

(73) Assignee: Gilmore Valve Co., Ltd., Houston, TX (US)

( * ) Notice: Subject to any disclaimer, the term of this patent is extended or adjusted under 35 U.S.C. 154(b) by 171 days.

(21) Appl. No.: 09/640,401

(22) Filed: Aug. 16, 2000

(51) Int. Cl.$^7$ .............................................. G05D 16/00
(52) U.S. Cl. ............................. 137/116.3; 137/115.15; 137/505; 137/505.18
(58) Field of Search .......................... 137/102, 116.3, 137/115.15, 505, 505.18

(56) References Cited

U.S. PATENT DOCUMENTS

| 3,033,578 | A |   | 5/1962  | Kellogg                    |
|-----------|---|---|---------|----------------------------|
| 3,455,566 | A |   | 7/1969  | Hull et al.                |
| 3,917,220 | A |   | 11/1975 | Gilmore ............ 137/116.3 |
| 4,150,737 | A | * | 4/1979  | Patton ............. 137/116.3 |
| 4,444,216 | A |   | 4/1984  | Loup ............. 137/115.15 |
| 4,493,335 | A |   | 1/1985  | Watson ............ 137/116.3 |
| 4,506,693 | A |   | 3/1985  | Acker                      |
| 4,572,518 | A |   | 2/1986  | Spargo et al.              |
| 4,579,143 | A | * | 4/1986  | Rollins et al. ......... 137/238 |
| 4,586,533 | A |   | 5/1986  | Estes                      |
| 4,681,327 | A |   | 7/1987  | d'Agostino et al.          |

OTHER PUBLICATIONS

54–2000 Series; Regulator Hydraulic; Tescom Corporation; 4/83.

* cited by examiner

Primary Examiner—Stephen M. Hepperle
(74) Attorney, Agent, or Firm—Blackwell Sanders Peper Martin LLP

(57) ABSTRACT

The precision regulator connects to a high pressure fluid source and regulates the pressure to a downstream apparatus. If an overpressure occurs, it can be vented to atmosphere. An elongate control stem engages a supply seal assembly and a vent seal assembly and moves axially and past these seal assemblies to achieve regulation and venting. The set point of the regulator can be adjusted by rotation of an adjustment knob that adjusts the position of the elongate control stem relative to the supply seal assembly and the vent seal assembly. Regulation is achieved primarily by use of a sensor piston which transfers fluid pressure from a regulated port to the sensor piston which is opposed by a spring.

Both the supply seal assembly and the vent seal assembly rely upon an o-ring and a seal ring to achieve a seal with the outside circumference of the control stem. The o-ring is compressed and distorted, thus exerting forces against the seal ring to achieve a better seal. Both the supply seal assembly and the vent seal assembly are bi-directional and operate when forces are applied to the o-ring in different directions.

4 Claims, 6 Drawing Sheets

PRECISION REGULATOR

BACKGROUND OF THE INVENTION

1. Field of the Invention

The present invention is a regulator used for regulating fluid pressures in a downstream apparatus. The regulator can also vent overpressures to atmosphere. In addition, an improved bi-directional seal design is used in conjunction with the sliding control stem.

2. Description of the Prior Art

Gilmore Valve Company, the assignee of the present invention, has sold shear valves and other types of regulators for many years. Examples of these prior art devices are shown in U.S. Pat. Nos. 3,917,220 and 4,493,335, both of which are included in the Information Disclosure Statement filed concurrently herewith. In order to adjust the set point for these prior art regulators, the operator was required to turn a large handle at the top of the apparatus which would compress springs on the inside of the apparatus. This was sometimes difficult at higher set points.

Other prior art regulators have adjustment knobs that can sometimes be turned too far, stripping the threads and/or ruining the regulator. A common prior art solution to this problem is anti-rotation pins.

Deadband is a generic term used to describe the envelope of performance when a regulator will not respond to pressure fluctuation. Some prior art devices have deadbands of several hundred pounds. These difficulties and other matters have not been fully addressed by the prior art.

It is known in the prior art to use dual seals in conjunction with each other in order to multiply the sealing force being exerted by one of the seals. For example, in U.S. Pat. No. 3,455,566, a circular o-ring is described as a unit force multiplying seal that exerts pressure on a controlling seal that has a triangular cross-section. Under compression, the shape of the circular o-ring is distorted and additional force is transferred to the second seal. However, this prior art design only works when pressure is applied from a specific direction. There is a need for a dual seal arrangement so that the second seal will function regardless of the direction of pressure that is being applied to the other seal.

SUMMARY OF THE INVENTION

Prior art regulators are often difficult to adjust accurately at higher pressures, because the adjustment knob must push against the full force of the sensor piston. In the present invention, the adjustment knob only moves a small diameter control stem. The force on the control stem is sufficient to stabilize the assembly, but requires only minimum adjustment force. The downstream fluid pressure is what moves the sensor piston.

The higher forces and torques of prior art regulators tended to wear out the threads in the adjustment mechanism. The lower forces in the present invention minimize this wear.

There are several types of deadband that describe the performance of regulators. Generally, larger deadbands are less desirable because they degrade the sensitivity of the regulator. Smaller deadbands can also negatively affect durability. Hence, an optimized design balances sensitivity with stability and durability.

The main drive for developing this regulator was an industry demand for more sensitivity of hydraulic regulators in the 1,000 to 10,000 psi range.

If the set pressure is adjusted upward from the forward adjustment set point, until the regulator just starts to supply, then the forward adjustment dead band (sensitivity) is the amount that the pressure increases until it stabilizes.

If the set pressure is adjusted downward from the reverse adjustment set point, until the regulator just starts to vent, then the reverse adjustment dead band (sensitivity) is the amount that the pressure decreases until it stabilizes.

For prior art regulators, both of these dead bands were often larger than 200 psi. The present design has less than a 50 psi adjustment dead band.

Droop dead band is the number of psi that the down stream pressure falls below the forward adjust set point before the regulator starts to supply fluid. Prior art droops were in the neighborhood of 20% of the set pressure. The present design droop is approximately 125 psi, even up to a 9000 psi set pressure.

Accumulation dead band is the number of psi that the downstream pressure increases above the forward adjust set point before the regulator starts to vent fluid. Prior art accumulations were also in the neighborhood of 20% of the set pressure. The present design accumulation dead band is near to 6%.

Prior art regulators tended to chatter or become unstable under certain flow conditions. The present invention has proved to be very stable and quiet due to the soft seat sliding control stem.

The seal is a bi-directional pressure energized seal that allows for a better lower friction seal. The o-ring behind the seal energizes and increases the force through an elastomer seal as differential pressure increases across the seal.

Strong individuals are sometimes known to turn adjustment knobs too hard and strip the threads or ruin prior art regulators. A common solution to this problem in prior art devices is anti-rotation pins. The present invention does not have anti-rotation pins and is believed to have a unique solution to the problem of excess torque. If the adjustment knob on the present invention is turned beyond full open or full closed, it merely causes the internal mechanisms to rotate, rather than strip threads or break.

BRIEF DESCRIPTION OF THE DRAWINGS

In FIG. 2, the regulator is in the neutral position and no fluid is flowing through the regulator.

BRIEF DESCRIPTION OF THE PREFERRED EMBODIMENT

Figure 1:
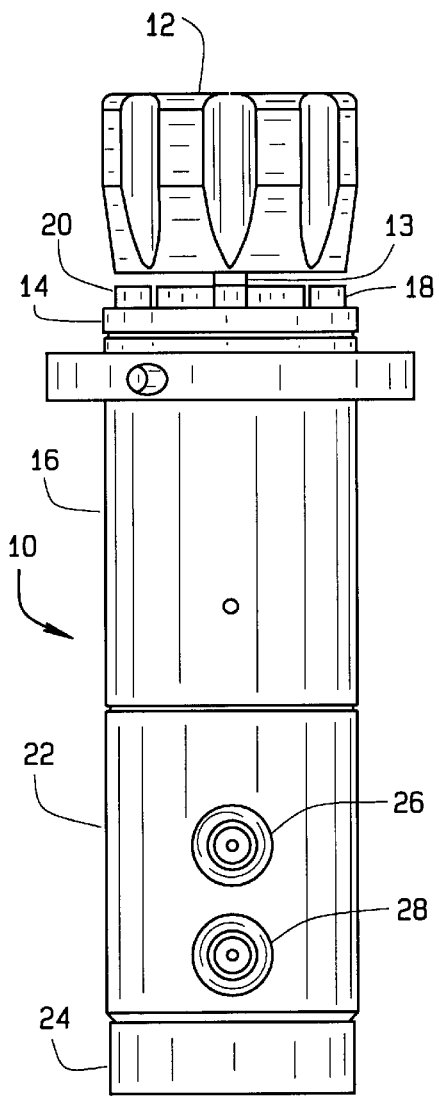
FIG. 1 is a side elevation view of the precision regulator showing the supply port and the vent port.

FIG. 1 is a side elevation view of the precision regulator generally identified by the numeral 10. An adjustment knob 12 connects to an adjusting stem 13 to adjust the set point of the precision regulator 10. The retainer cap 14 is connected to the spring housing 16 by a plurality of cap screws 18 and 20. The spring housing 16 threadibly engages the regulator body 22. A bottom flange 24 is connected to the regulator body 22 by a plurality of cap screws, not shown. The supply port 26 and the vent port 28 are formed in the regulator body 22.

Figure 2:
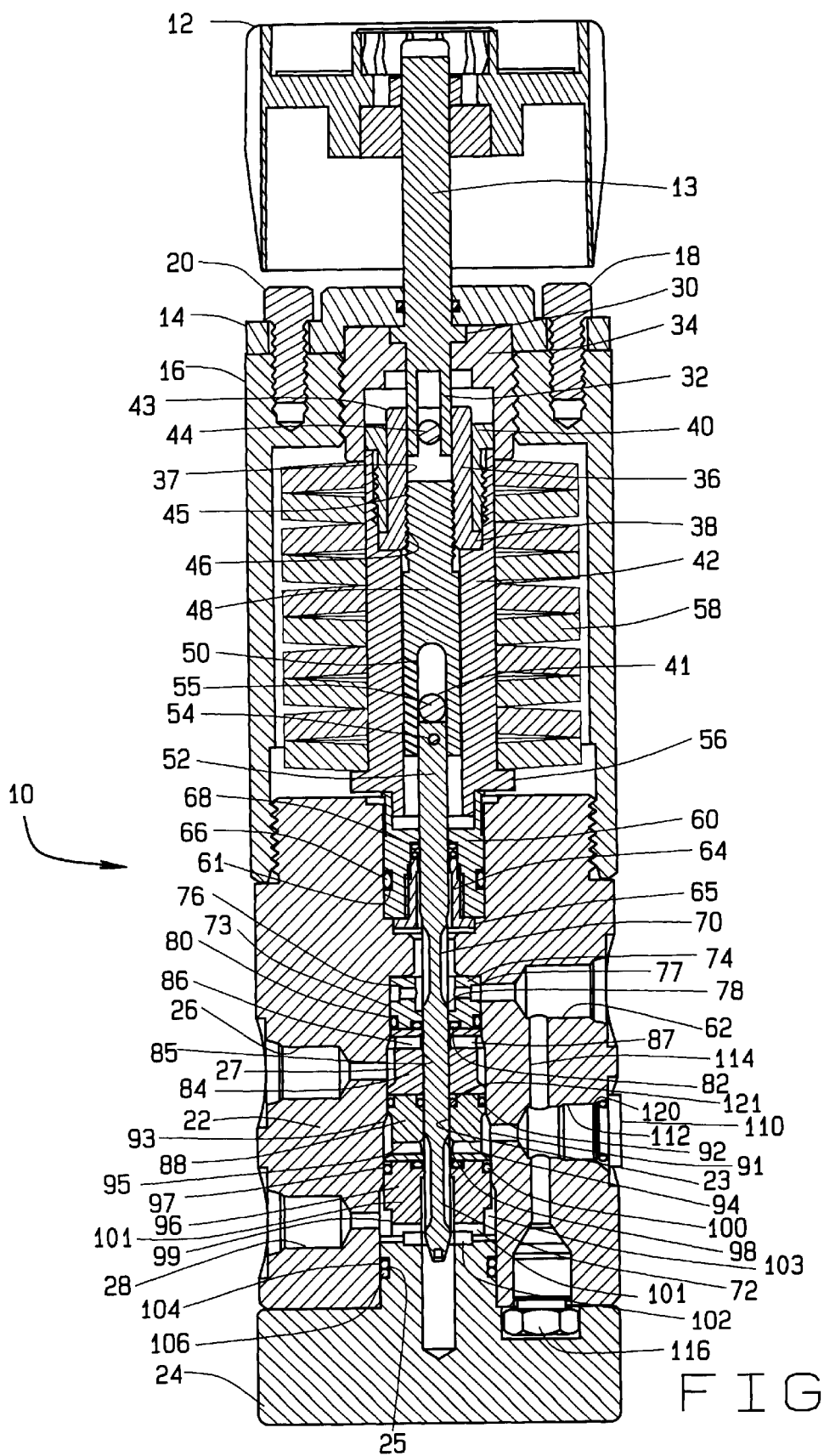
FIG. 2 is a section view of the precision regulator rotated ninety degrees clockwise from the view in FIG. 1.

FIG. 2 is a section view of the precision regulator of FIG. 1 except the orientation of the regulator has been rotated 90° clockwise. The adjustment knob 12 connects to an adjusting stem 13 which transmits rotational position to other components of the regulator as discussed below. The adjusting stem 13 includes an outwardly projecting circumferential flange 30 about half way between both ends and a clevis 32 on the end opposite the knob 12. The retainer cap 14 is secured to the spring housing 16 by a plurality of cap screws 18 and 20. A spring retainer 34 threadibly engages the upper end of the spring housing 16 and captures the outward flange 30 of the adjusting stem 13 against the retainer cap 14, allowing just enough room for the upper stem to rotate. Therefore, the knob 12 and upper stem 13 can rotate but are fixed axially to the spring housing 16.

The adjusting sleeve 36 has a hollow bore 37 through the longitudinal axis and an outwardly extending circumferential flange 38 on one end. The stem retainer 40 threadibly engages the spring guide 42 and captures the outwardly extending radial flange 38 of the adjusting sleeve 36 against the bottom of the spring guide 42 counter bore, allowing just enough clearance for the adjusting sleeve 36 to rotate. Therefore, the adjusting sleeve 36 is allowed to rotate, but is fixed axially with respect to the spring guide 42.

The adjusting sleeve 36 has a transverse bore 43 on the end opposite the flange 38. The adjusting sleeve pin 44 passes through the transverse bore 43 in the adjusting sleeve 36 and the clevis 32 in the adjusting stem 13. Therefore, when the adjustment knob 12 is rotated, the adjusting stem 13, rotates as well as the adjusting sleeve pin 44 and the adjusting sleeve 36. The clevis 32 allows the adjusting sleeve 36 to move axially with respect to the upper stem 20 and the knob 12. One end of the hollow central bore 37 of the adjusting sleeve 36 is threaded. The bore of the adjusting sleeve 36 has threads 45 below where the transverse bore 43 is positioned. The threads 45 engage threads 46 on the upper control stem 48. Axial pin 55 passes through a transverse hole 41 in the spring guide 42 and a transverse slot 50 in the upper control stem 48.

The pin 55 in the slot 50 allows the upper control stem 48 to move axially, but not rotationally with respect to the spring guide 42. The result is that as the adjustment sleeve 36 is rotated relative to the spring guide 42, the upper control stem 48 move axially with respect to the spring guide. The lower control stem 52 is pinned to the upper control stem 48 by the pin 54. The two stems move axially together.

Thus, rotation of the knob 12 causes the upper control stem 48 and the lower control stem 52 to move axially with respect to the spring guide 42, while allowing the spring guide 42 to move with respect to the knob 12, spring housing 16 and regulator body 22. Thus, rotating the adjustment knob 12 counter-clockwise brings the set point to 0 psi and rotating the adjustment knob 12 clockwise brings the regulator 10 to its maximum set point.

The spring guide 42 includes an outwardly extending radial flange 56 on one end which captures the spring 58 against the spring retainer 34. The axial pin 55 passes through a transverse bore 41 in the spring guide 42 and slips back and forth in the slot 50 of the upper control stem 48. This feature allows adjustment of the lower control stem 52 independent of the springs 58. Rotation of the adjustment knob 12 does not increase or decrease the force being applied against the spring 58 by the spring guide 42. The force that is applied to the spring 58 is applied through the sensor piston 60 that is in contact with the flange 56 of the spring guide 42. Pressure from the regulated port 62 is applied against the sensor piston 60 which is then transferred via the flange 56 on the spring guide 42 to the spring 58.

The sensor piston 60 threadibly engages the retaining nut 64. The sensor piston 60 includes an external o-ring groove 61, which receives o-ring 66 and back up ring. The o-ring 66 and back-up ring achieve a dynamic seal between the body 22 and the sensor piston 60. The sensor piston also has an axial through hole. The retaining nut 64 captures the o-ring 68 and another back-up ring to achieve a dynamic seal between the sensor piston 60 and the lower control stem 52. The lower control stem 52 includes a plurality of flow passages 70 that permit fluid flow from the supply port to the regulated port 62 when the flow passages 70 are proximate with the supply seal assembly 82. A second set of flow passages 72 are formed in the lower control stem 52 which permit fluid to flow from the regulated port 62 to the vent port 28 when the flow passages 72 are proximate to the vent seal assembly 98.

An upper cylinder cage 74 is located in the bore of the body 22, adjacent to the regulated port 62. The upper cylinder cage 74 has a plurality of radial bores 76 and 77 and a longitudinal bore 78. Fluid can flow from the regulated port 62 through the radial bores 76 and 77 into the longitudinal bore 78. An o-ring groove 73 is formed on the outside circumference of the upper cylinder cage 74 and receives the o-ring 80. The supply seal assembly is generally identified by the numeral 82 and will be discussed in greater detail with regards to FIGS. 7, 8 and 9.

The lower control stem 52 passes through a longitudinal bore 85 in the supply cage 84. A plurality of radial bores 86 and 87 in the supply cage 84 extend from the longitudinal bore 85 to a circumferential groove 27.

Figure 3:
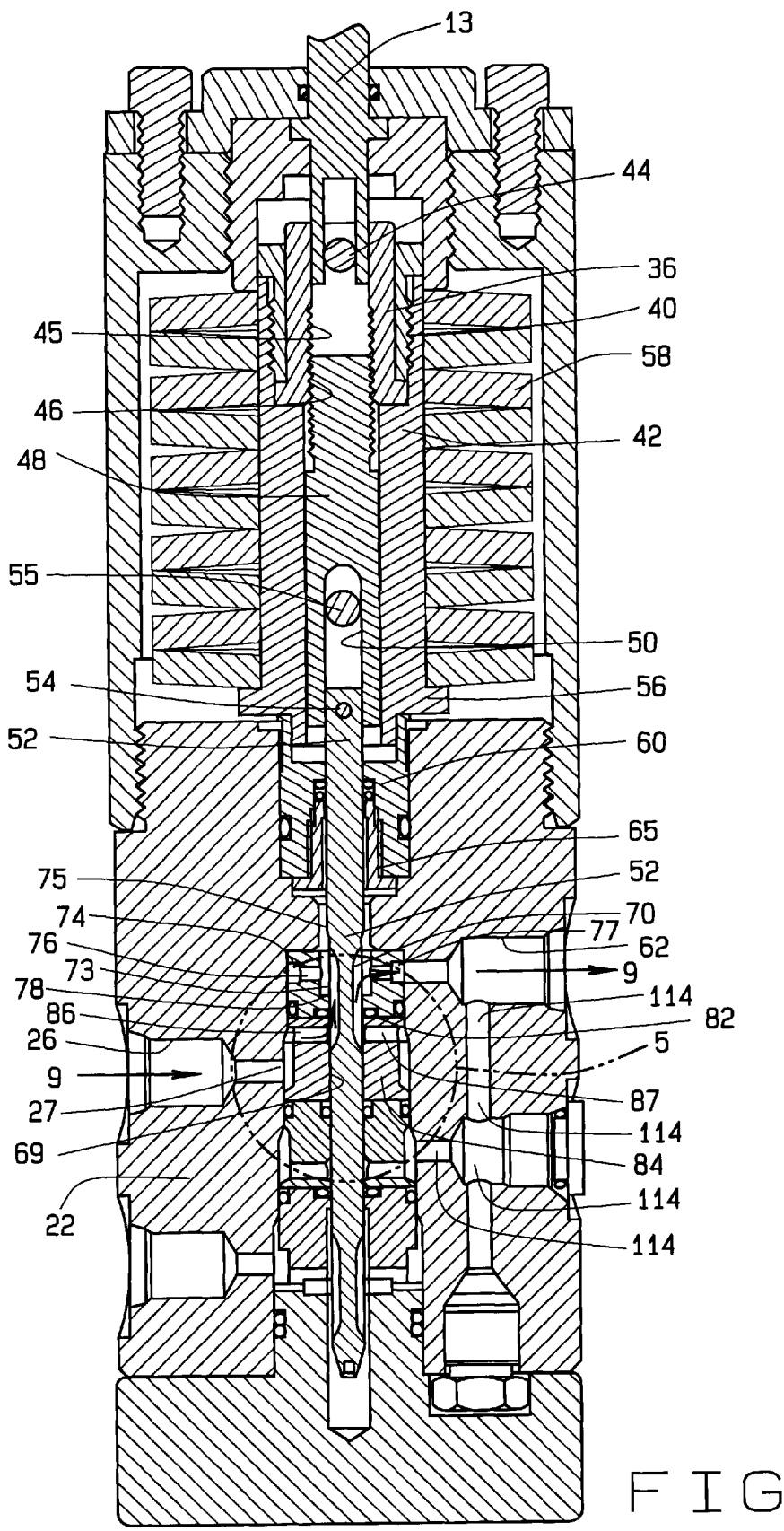
FIG. 3 is an enlarged section view of the precision regulator of FIG. 2, except fluid is flowing from the supply port to the regulated port, as indicated by the flow arrows.

A flow passageway sometimes called the supply passageway 9 extends from the supply port 26 to the regulated port 62 as indicated by the flow arrows in FIG. 3. Fluid moves from the supply port 26 through a circumferential groove 27 in the supply cage 84 through the radial bores 86 and 87 and into the longitudinal bore 85 of the supply cage 84. The fluid then moves into the longitudinal bore 78 of the upper cylinder cage 74 and through the radial bores 76 and 77 into the regulated port 62.

The seal retainer 88 has a longitudinal bore 23 through which passes the lower control stem 52. A plurality of radial bores 94 and 95 extend from the longitudinal bore 23 to the circumference groove 93 of the seal retainer 88.

An O-ring channel 91 is formed in outside circumference of the seal retainer 88 to receive the O-ring 92. The O-ring 92 forms a seal between the seal retainer 88 and the body 22.

Another O-ring groove 120 is formed around the longitudinal bore 23 to receive O-ring 121 and forms a seal between the seal retainer 88 and the lower control stem 52. A plurality of radial bores 94 and 95 are formed in the seal retainer 88. These bores extend from a circumferential groove 93 to the longitudinal bore 23.

The bottom guide 96 has a longitudinal bore 101 which receives the lower control stem 52. On the outside diameter of one end of the bottom guide 96 is a circumferential groove 103. On the other end of the bottom guide 96 is an O-ring channel 97 that receives and supports O-ring 100. O-ring 100 seals the bottom guide 96 against the body 22. The vent seal assembly is generally identified by the numeral 98 and is similar to the supply seal assembly which will be discussed in greater detail with regard to FIGS. 7, 8 and 9. A plurality of radial bores 99 and 101 are formed in the bottom guide 96 providing fluid communication between the longitudinal central bore 101 and the outside groove 103 of the bottom guide 96.

In order to take up manufacturing tolerances, a crush washer 102 is captured between the bottom guide 96 and the bottom flange 24. A groove 25 is formed in the bottom flange 24 and it receives an O-ring 104 and a back-up ring 106. The bottom flange 24 is sealed against the body 22 by the O-ring 104 and the back-up ring 106.

A plug 110 is installed in a plug port 112 in the body 22. The plug 110 can be removed and a gauge can be placed in this port at the preference of the user. A passageway 114 is bored parallel to the longitudinal axis of the valve 10 through the body 22, the port 112 and into the regulated port 62. A JIC fitting 116 is threaded in the body 22 to close off one end of the passageway 114.

Figure 4:
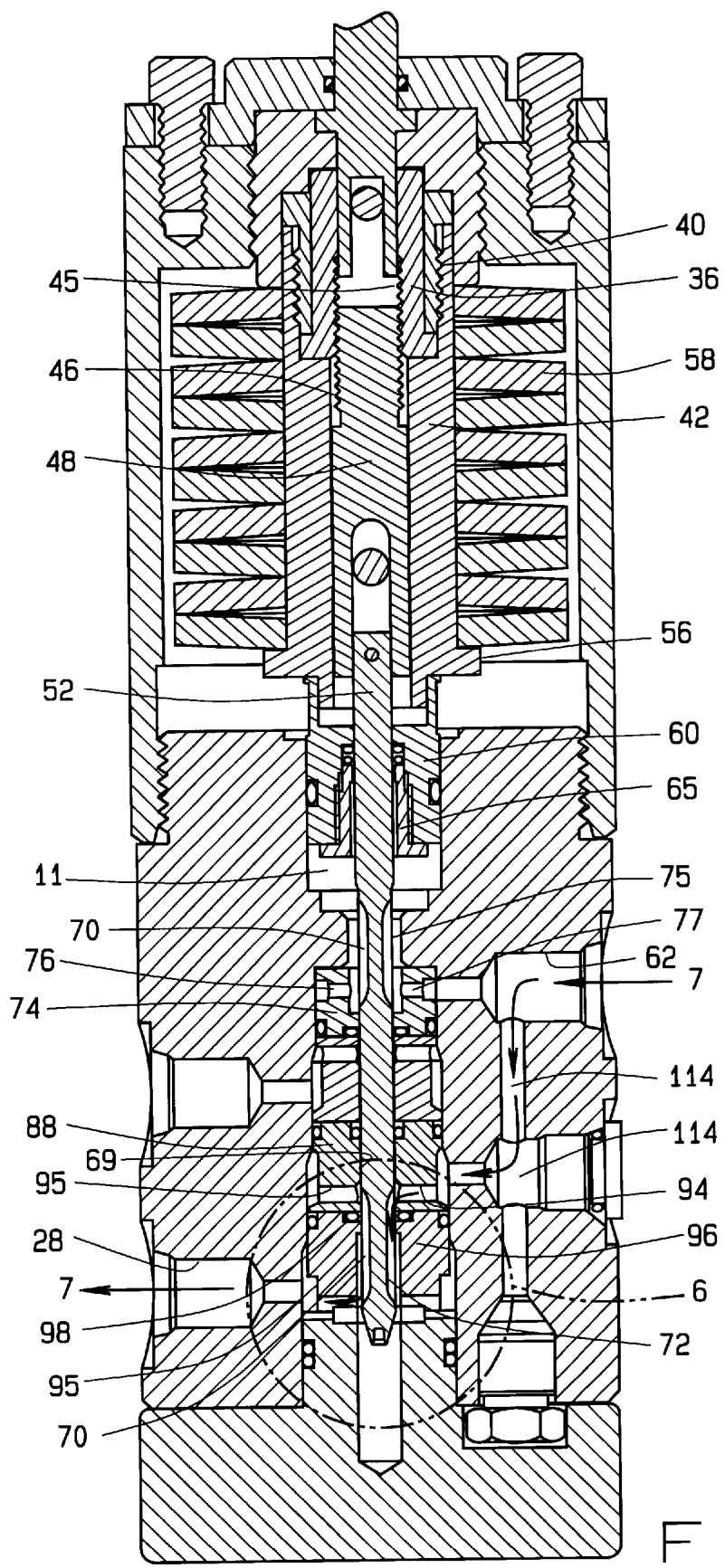
FIG. 4 is an enlarged section view of the precision regulator of FIG. 2, except fluid is flowing from the regulated port to the vent port, as indicated by the flow arrows.

A flow passageway, sometimes called the vent passageway 7 extends from the regulated port 62 to the vent port 28 as indicated by the flow arrows of FIG. 4 when the control stem 52 is in an appropriate position allowing the flow slots 72 to be in position to allow communication between the radial bores 94 and 95 in the seal retainer 88 and the radial bores 99 and 101 in the bottom guide 96. Fluid moves from the regulated port 62, through the passageway 114 into the radial bores 94 and 95 and into the longitudinal bore 23 of the seal retainer, into the longitudinal bore 103 through the radial bores 99 and 101 of the bottom guide 96 and out the vent port 28. FIG. 2 shows the regulator 10 in the neutral position when fluid is not flowing through the regulator.

FIG. 3 is an enlarged section view of the regulator of FIG. 2. In FIG. 3, pressurized fluid is flowing through the supply passageway 9 as indicated by the flow arrows 9—9, from the supply port 26 to the regulated port 62. Turning the know 12 clockwise moves the lower control stem 52 downward (from the position shown in FIG. 2), thus unseating the slots 70 in the control stem 52 from the supply seal assembly 82. Fluid moves along the supply passageway 9 as follows: from the supply port 26, around the circumferential groove 27 in the supply cage 84 through the radial bores 86 and 87, through the longitudinal passageway 85, into the longitudinal passageway 78 of the upper cylinder cage 74 and thereafter through the radial bores 76 and 77 into the regulated port 62.

The lower control stem 52 is moved downward as shown in FIG. 3 by rotating the knob 12 clockwise. This adjusts the set point in the regulated port 62. When the knob 12 is rotated clockwise, the adjusting stem 13 is rotated clockwise which rotation is then imparted through the adjusting sleeve pin 44 to the adjusting sleeve 36. The reverse threads 45 on the adjusting sleeve 36 and the threads 46 on the upper control stem 48 cause the upper control stem 48 to move downward in response to the clockwise rotation of the control knob 12. The upper control stem 48 is able to move downward because of the slot 50 which allows axial movement vis-a-vis the spring guide pin 55. The lower control stem 52 is connected to the upper control stem 48 by the control stem pin 54. The upper control stem 48 and the lower control stem 52 move axially as a unit. As a matter of manufacturing choice, the upper control stem 48 and the lower control stem 52 could be fabricated as a single part.

As the lower control stem 52 moves downward, the outer circumference 69 of the lower control stem 52 moves away from the supply seal assembly 82, thus allowing fluid to pass through the radial bores 86 and 87, through the flow slots 70 in the lower control stem 52, through the longitudinal passageway 78, and the radial bores 76 and 77 to the supply port 62, as shown by the flow arrows in the drawing. After the pressure in the regulated port 62 increases to set point or set pressure, the pressure in the regulated port 62 passes through the passageway 75 in the body 22 and is exerted upon the retaining nut 65 and the sensor piston 60. As the sensor piston moves upward, it transfers the axial force to the flange 56 of the spring guide 42, thus compressing the spring 58. As the spring guide 42 moves upward, this axial movement is transferred to the stem retainer 40 and the adjusting sleeve 36. The threads 45 in the adjusting sleeve 36 engage the threads 46 on the upper control stem 48, thus imparting upward axial movement to the upper control stem 48, thus moving the lower control stem 52 upward, when the adjusting sleeve 36 moves upward. As the lower control stem 52 moves upward the flow slots 70 move upward and the outer circumference 69 of the lower control stem 52 again engages the supply seal assembly 82, thus blocking further flow from the supply port 26 into the regulated port 62 through the supply passageway 9.

If, for some reason, the regulated pressure drops, the spring 58 will relax. The piston 60 will move downward until the slot 70 crosses the supply seal assembly 82. Fluid will flow from the supply port 26 until the pressure increases to the set point which will be enough to move the outer circumference 69 of the lower control stem 52 back into engagement with the supply seal assembly 82.

When there is an overpressure situation in the regulated port 62, the lower control stem 52 moves axially upward, thus allowing the fluid to move from the regulated port 62 to the vent port 28 through the vent passageway 7, as better seen in FIG. 4.

FIG. 4 is an enlarged section view of the regulator of FIG. 2 in the vent position, as shown by the flow arrows. The fluid in the regulated port 62 exerts axial pressure on the sensor piston 60 causing compression of the spring 58 which causes the lower control stem 52 to move upward, as previously discussed. When the lower control stem 52 moves axially upward, the flow slots 72 disengage from the vent seal assembly 98 allowing fluid to flow as indicated by the flow arrows in FIG. 4.

To vent overpressure in the regulated port 62, the lower control stem 52 must move axially upward. This is achieved through the following interaction. The fluid in the regulated port 62 moves through the radial bores 76 and 77 in the upper cylinder cage 74 and through the angular passageway 75 into a pressure chamber 11. The pressurized fluid exerts force on the retaining nut 65 and the sensor piston 60 which surround the lower control stem 52 but do not impart axial movement to the lower control stem 52. Rather, the axial movement is transmitted from the sensor piston 60 to the flange 56 of the spring guide 42. This causes compression of the spring 58. The axial upward movement of the spring guide 42 is transmitted to the upper control stem 48 through the stem retainer 40 and thereafter to the adjusting sleeve 36. As previously discussed, the adjusting sleeve 36 is threadibly engaged to the upper control stem 48 and therefore any axial movement in the adjusting sleeve 36 is immediately transferred to the upper control stem 48 and thereafter to the lower control stem 52. When the outer circumference 69 of the lower control stem 52 disengages from the vent seal assembly 98, fluid can then pass through the slots 72 in the lower control stem 52 and thereafter to the vent port 28.

As the venting process occurs, the amount of pressure on the sensor piston 60 diminishes. When this overcomes a predetermined set point, the force in the spring 58 overcomes the pressurized fluid force in the chamber 11, thus driving the spring guide 42 back to its lower position of FIG. 2. When the spring guide 42 moves axially downward, it carries the upper control stem 48 and the lower control stem 52 downward, as previously discussed which causes the flow slots 72 to move downward and thus outside circumference 69 of the lower control stem 52 re-engages with the vent seal assembly 98 thus stopping fluid flow.

Figure 5:
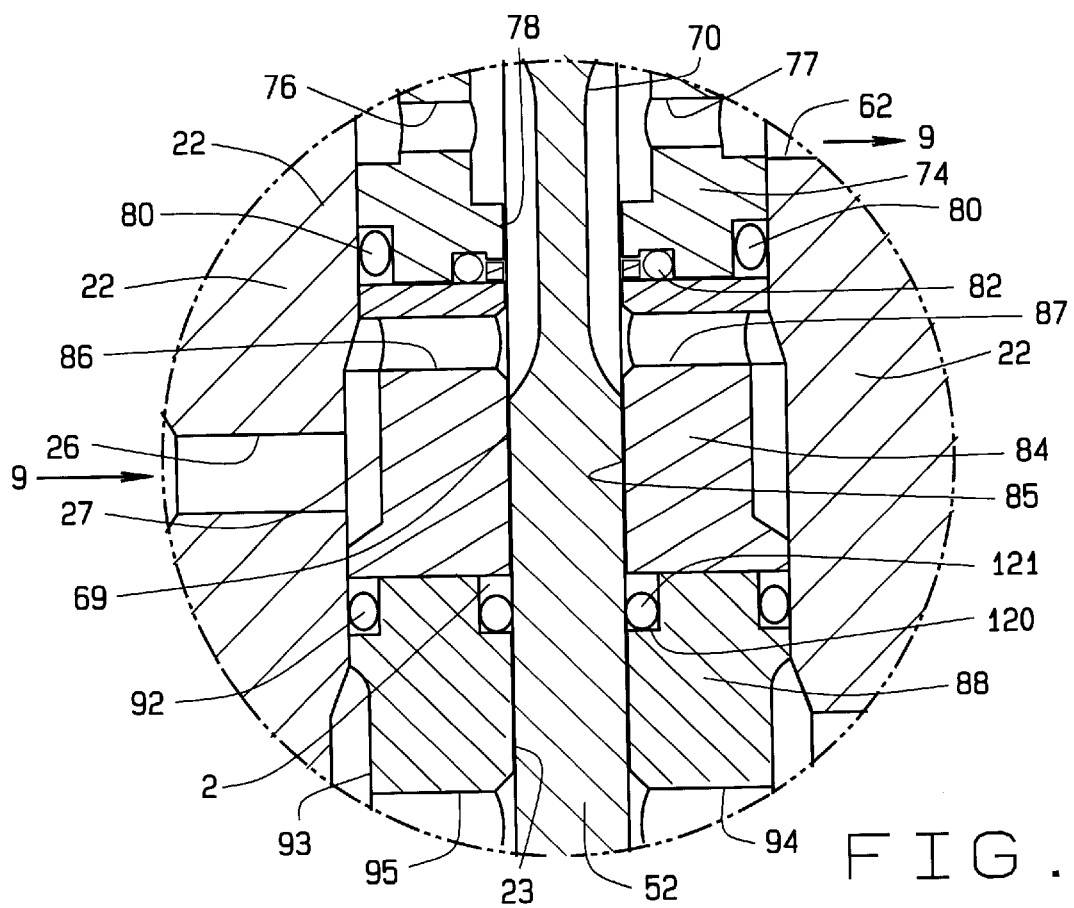
FIG. 5 is an enlarged section view of the precision regulator in the proximity of the supply seal assembly.

FIG. 5 is an enlargement of a portion of the regulator 10 showing the internal components in the open position of FIG. 3. As previously discussed, when fluid moves from the high pressure supply port 26 to the regulated port 62, along the supply passageway 9. The supply passageway 9 is defined by the circumferential groove 27 in the supply cage 84, the radial bores 86 and 87, the longitudinal passageway 85 in the supply cage and the longitudinal passageway 78 in the upper cylinder cage 74. The passageway then extends through the radial bores 76 and 77 in the upper cylinder cage 74 and out to the regulated port 62, as indicated by the flow arrows in FIG. 3.

Figure 6:
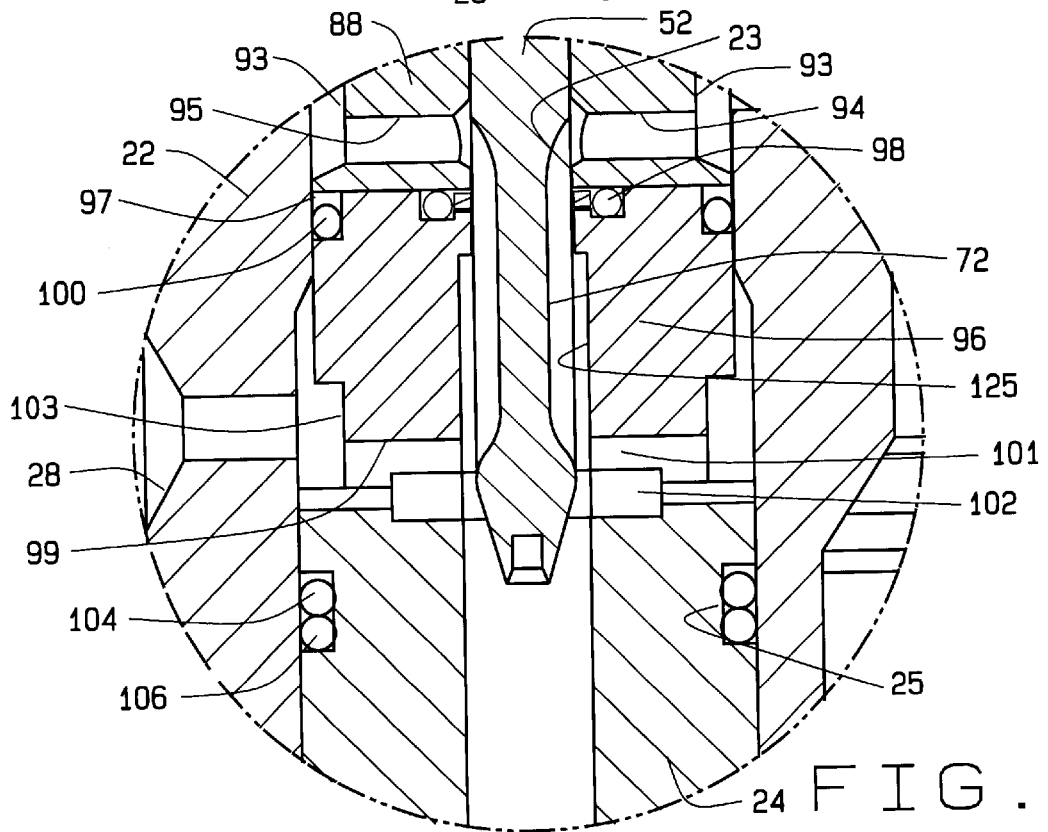
FIG. 6 is a section view of a portion of the precision regulator in the proximity of the vent seal assembly.

FIG. 6 is an enlarged section view of a portion of the regulator 10, showing the internal components in the vent position of FIG. 4. In FIG. 6, the lower control stem 52 has achieved its maximum axial upward position allowing fluid to move from the regulated port 62 through the vent passageway 7 to the vent port 28. The vent passageway 7 is defined by the passageway 114, the circumferential groove 93 and the radial bores 94 and 95 in the seal retainer 88. The passageway then extends through the longitudinal passage 23 in the seal retainer 88 and thereafter to the longitudinal central bore 101 in the bottom guide 96. The fluid then enters the radial bores 99 and 101 of the bottom guide 96 and thereafter passes into a circumferential groove 103. The fluid is then free to pass to the vent port 28 which is open to atmosphere.

Once the pressure in the regulated port 62 has returned to the set point, the force in the spring 58 will be exerted upon the flange 56 of the spring guide 42, thus causing downward axial movement of the upper control stem 48 and the lower control stem 52, which causes the radial flow slots 72 to move downward, thus re-engaging the outer circumference 69 of the lower control stem 52 with the vent seal assembly 98.

Figure 7:
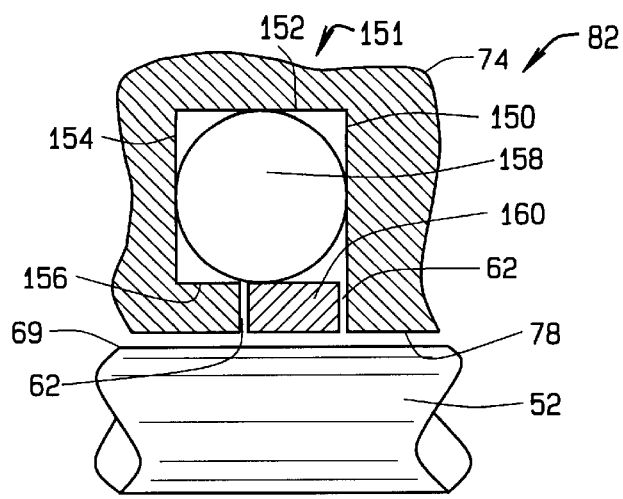
FIG. 7 is a section view of a portion of the supply seal assembly and control stem without any force being exerted on the o-ring or the seal ring.

FIG. 7 is an enlarged partial section view of one half of the supply seal assembly 82. The upper cylinder cage 74 has an o-ring channel or a hollow o-ring support structure 151 formed therein. The o-ring channel 151 is defined by an outer wall 152, two opposing side walls 150 and 154 and an inner wall 156, extending from one side wall less than half the length of the outer wall, thus creating an opening 62 to the longitudinal bore 78 in the cylinder cage 74. A flat seal ring 160 is positioned in the opening 62 between the side wall 150 and the end of the inner wall 156. The lower control stem 52 is shown in reduced perspective to save space; it is not proportioned to the size of the o-ring in the actual embodiment. The outer circumference 69 of the lower control stem moves axially in the longitudinal passageway 78 of the upper cylinder cage 74.

The o-ring 158 and the seal ring 160 are shown in a relaxed position in FIG. 7, without any force being applied from either the supply port 26 or the regulated port 62. Applicants have found that a ⅜ inch outside diameter×¼ inch inside diameter×1/16 inch cross-section BUNA N90 duro National C67 compound o-ring is suitable for the o-ring 158. Other o-rings with similar properties from other manufacturers such as Parker may also be suitable.

Applicants have found that a 0.260 inch outside diameter 0.184 inch inside diameter×0.034 inch thick seal ring manufactured from PEEK (polyetheretherketone) is suitable for the seal ring 160. Other materials with similar rigidity and strength properties to PEEK may also be suitable.

Those skilled in the art will understand that the seal ring 160 is circular and fully surrounds the outside circumference 69 of the lower control stem 52. They will likewise recognize that the O-ring 158 is circular in shape and therefore it completely encircles the lower control stem 52 like the seal ring 160.

Figure 8:
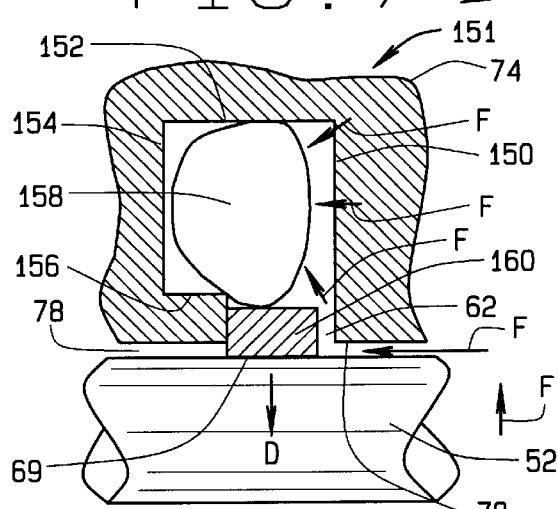
FIG. 8 is a section view of a portion of the supply seal assembly with pressure being exerted on the o-ring and the seal ring, as indicated by the arrows.

FIG. 8 is a partial section view of the supply seal assembly 82 under fluid compression when the regulator is in the neutral position and of FIG. 2. In this view, a seal has been achieved between the outside circumference 69 of the lower control stem 52 and the seal ring 160. Further, a seal has been achieved between the o-ring 158, the body 22, and the seal ring 160, thus preventing fluid from passing from the supply port 26 to the regulated port 62. High pressure fluid from the supply port 26 extends into the angular passageway 78 and into the o-ring channel or hollow o-ring support structure 151. The pressurized fluid enters the o-ring channel 151, as indicated by the arrows F, causing the o-ring 158 to be compressed and distorted, as shown approximately in the drawing. The distortion of the o-ring 158 causes it to extend into the opening 162, thus exerting inward radial forces on the seal ring 160, as shown by the arrow D. As the seal ring 160 is forced into contact with the outside circumference 69 of the lower control stem 52, it forms a tighter seal. This is sometimes referred to as a sliding seal because the control stem 52 moves axially up and down across the inner surface of the seal ring 160.

Figure 9:
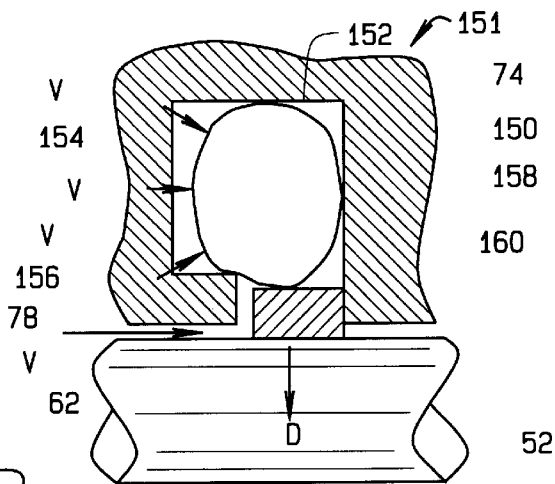
FIG. 9 is a section view of a portion of the supply seal assembly with pressure being exerted against the o-ring and the seal ring from the opposite direction of FIG. 8.

FIG. 9 is a partial section view of the supply seal assembly 82. In FIG. 9, the direction of the high pressure hydraulic fluid has been reversed from the direction of FIG. 8. When the regulator is in the vent position, as shown in FIG. 4, high pressure fluid moves through the angular opening 78 in the upper cylinder cage 74, as indicated by the flow arrows labeled V. This pressurized fluid then moves into the O-ring channel or support structure 151 as further indicated by the arrows V. The force of the hydraulic fluid compresses the O-ring 158 causing it to protrude into the opening 62. When it protrudes into this opening, it exerts forces on the seal ring 160, as indicated by the arrow D. This causes the seal ring to engage and make a better seal with the outside diameter 69 of the lower control rod 52 and the upper cylinder cage 74. The supply seal assembly 82 is bi-directional and can create a sliding seal with the outside diameter 69 of the lower control rod 52 when high pressure fluid enters the O-ring channel 151 as indicated by the arrows in FIG. 9 or when the fluid reverses direction and enters the o-ring channel 151, as shown in FIG. 8. The vent seal assembly 98 is formed in the same fashion as the supply seal assembly 82, except the inner wall 156 extends from the sidewall 150 instead of sidewall 154, as better seen in FIG. 6.

Figure 10:
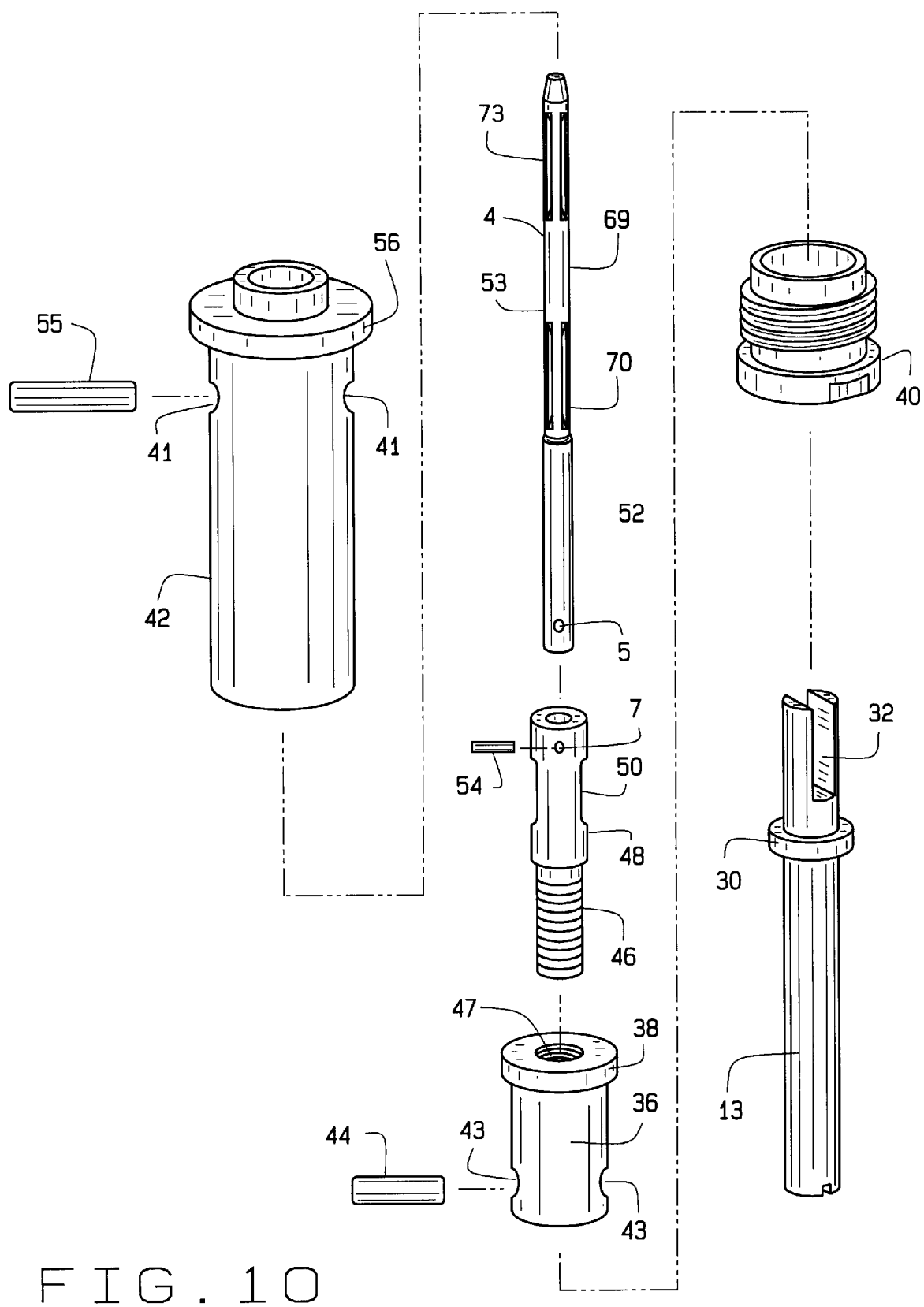
FIG. 10 is an enlarged perspective view of the control stem and some of the inner components of the precision regulator of FIG. 2.

FIG. 10 is an exploded perspective view of some of the inner components of the regulator 10. The adjusting stem 13 has a radial flange 30 and a clevis 32 formed on one end. The stem retainer 40 threadibly engages the spring guide 42, thus capturing the adjusting sleeve 36 by virtue of the radial flange 38. The adjusting sleeve pin 44 passes through a transverse bore 43 to one end of the adjusting sleeve 36 and fits in the clevis 32 of the adjusting stem 13.

The spring guide 42 has a radial flange 56 formed on one end thereof. The spring guide pin 55 fits in a transverse aperture 41 formed through the spring guide 42. The upper control stem 48 is threaded on one end 46 and has a longitudinal slot 50 formed therein. The longitudinal slot allows movement of the upper control stem 48 axially relative to the spring guide stem 55. An aperture 7 is formed on one end of the upper control stem 48 to receive the control stem pin 54. The lower control stem 52 likewise has an aperture 5 which, when aligned with the aperture 7, receives the control stem pin 54, thus causing the upper control stem 48 and the lower control stem 52 to move axially as one component. Longitudinal flow slots 70 are formed in the lower control stem 52 and allow fluid to pass from the supply port 26 to the regulated port 62 when the lower control stem 52 and slots 70 are in the proper position relative to the supply seal assembly 82. In the neutral position, the supply seal assembly 82 makes a seal against the outside circumference 69 approximately at the point indicated at 53. Likewise, the vent seal assembly 98 forms a seal about the outside circumference 69 of the lower control stem 52 at a point approximately indicated by the numeral 4. Longitudinal flow slots 72 are formed in the lower control stem 52 and allow fluid to pass from the regulated port 62 to the vent port 28 when the lower control stem 52 and slots 72 is in the proper position relative to the vent seal assembly 98.

What is claimed is:

1. A regulator connected to a pressurized fluid supply and a downstream apparatus, the regulator comprising:
    a body having a supply port, a regulated port and a vent port, the supply port connected to the pressurized fluid supply, the regulated port connected to the downstream apparatus and the vent open to atmosphere;
    a supply passageway in the body connecting the supply port and the regulated port;
    a vent passageway in the body connecting the regulated port and the vent port;
    an elongate movable control stem positioned in the first passageway and the second passageway;
    a supply seal assembly positioned in the first passageway to selectively seal with the control stem and selectively allow the flow of fluid from the supply port to the regulated port as the control stem moves from a closed position to a open position;
    a vent seal assembly positioned in the second passageway to selectively seal with the control stem and selectively allow the flow of fluid from the regulated port to the vent port as the control stem moves to a vent position; and
    an adjustment assembly to move the control stem from the closed position to the open position or the vent position to regulate pressure in the regulated port, the assembly having:
        a spring captured between a sensor piston and a spring retainer;
        an external adjustment knob operatively connected to the control stem to move the control stem laterally, relative to the position of the supply seal assembly and the vent seal assembly to adjust a set pressure of the regulator; and
        the sensor piston being exposed to pressurized fluid in the regulated port to move the control stem when fluid pressure in the regulated port exceeds the set pressure to allow fluid to flow from the regulated port to the vent port and to move the control stem in the opposite direction when fluid pressure in the regulated port is below the set pressure to allow fluid to flow from the supply port to the regulated port.

2. A regulator connected to a pressurized fluid supply and a downstream apparatus, the regulator comprising:
    a body having a supply port, a regulated port and a vent port, the supply port connected to the pressurized fluid supply, the regulated port connected to the downstream apparatus and the vent open to atmosphere;
    a supply passageway in the body connecting the supply port and the regulated port;
    a vent passageway in the body connecting the regulated port and the vent port;
    an elongate movable control stem positioned in the first passageway and the second passageway;
    a supply seal assembly positioned in the first passageway to selectively seal with the control stem and selectively allow the flow of fluid from the supply port to the regulated port as the control stem moves from a closed position to a open position;
    a vent seal assembly positioned in the second passageway to selectively seal with the control stem and selectively allow the flow of fluid from the regulated port to the vent port as the control stem moves to a vent position; and
    an adjustment assembly to move the control stem from the closed position to the open position or the vent position to regulate pressure in the regulated port, the assembly having:
        a spring housing connected to the body;
        an adjustment stem having a knob on one end and a clevis on the other end, the adjustment stem mounted in the spring housing with a knob on an outside of the spring housing and the clevis on an inside of the spring housing, the adjustment stem and clevis rotating when the knob is rotated;
        a spring having a longitudinal center opening;
        an elongate tubular spring guide having a flange on one end, the spring carried by the tubular spring guide and being captured between the flange and the housing, the tubular spring guide having a hollow longitudinal central shaft and a transverse aperture;
        an elongated adjusting sleeve having an axial central bore, the adjusting sleeve having a radial flange on one end and a transverse hole in the other end, the clevis of the adjustment stem being inserted in the axial central bore and the adjusting sleeve positioned in the hollow central shaft of the spring guide on the end opposite the flange;
        an adjusting sleeve pin sized and arranged to fit in the transverse hole in the spring guide and to pass through an opening in the clevis so rotation of the knob and adjustment stem causes like rotation of the adjusting sleeve and also allows axial movement of the adjusting sleeve relative to the adjustment stem;
        a stem retainer threadibly engaging the hollow central shaft of the spring guide trapping the adjusting sleeve in the spring guide and causing the adjusting sleeve to move axially with the spring guide;

an elongate control stem having a transverse slot, the control stem connected with reverse threads to the axial bore of the adjusting sleeve so rotation of the knob, adjusting stem and adjusting sleeve causes axial movement of the control stem;

a spring guide pin sized and arranged to fit in the transverse aperture of the spring guide and to pass through the slot in the control stem; and a sensor piston mounted in the body and exposed to pressurized fluid in the regulated port, the sensor piston abutting the spring guide so pressure from the pressurized fluid is transferred through the sensor piston and spring guide to the spring causing axial movement of the spring guide, stem retainer, adjusting sleeve and control stem to achieve regulation of the pressure in the regulated port.

3. A regulator connected to a pressurized fluid supply, a downstream apparatus and a vent, the regulator comprising:

a body having a supply port, a regulated port and a vent port, the supply port connected to the pressurized fluid supply, the regulated port connected to the downstream apparatus and the vent port open to atmospheric pressure;

a passageway in the body allowing fluid communication between the supply port and the regulated port and fluid communication between the regulated port and the vent port, the passageway further defining an axial opening in the body for an elongate control stem;

the control stem operatively connected to an external adjustment knob to adjust a set point of the regulator, the control stem having a closed position in which no fluid flows through the regulator, an open position in which fluid flows from the supply port to the regulated port through the passageway in the body, and a vent position in which fluid flows from the regulated port to the vent port through the passageway in the body;

the control stem having a central shaft with upper flow slots proximate a supply seal assembly and lower flow slots proximate a vent seal assembly, the central shaft concurrently sealing against the supply seal assembly and the vent seal assembly to prevent fluid flow through the regulator when the control stem is in the closed position;

the control stem being moved by rotation of the external adjustment knob, to disengage the upper flow slots in the control stem from the supply seal assembly which allows pressurized fluid to flow from the supply port to the regulated port, through the passageway in the body when the control stem is in the open position;

the control stem being operatively connected to a sensor piston which is exposed to pressurized fluid in the regulated port to move the control stem when fluid pressure in the regulated port exceeds the set pressure to disengage the lower flow slots from the vent seal assembly to allow fluid to flow from the regulated port to the vent port, through the passageway in the body when the control stem is in the vent position.

4. A regulator connected to a pressurized fluid supply, a downstream apparatus and a vent, the regulator comprising:

a body having a supply port, a regulated port and a vent port, the supply port connected to the pressurized fluid supply, the regulated port connected to the downstream apparatus and the vent port open to atmospheric pressure;

a passageway in the body allowing fluid communication between the supply port and the regulated port and fluid communication between the regulated port and the vent port, the passageway further defining an axial opening in the body for an elongate control stem;

the control stem operatively connected to an external adjustment knob to adjust the set point of the regulator, the control stem having a closed position in which no fluid flows through the regulator, an open position in which fluid flows from the supply port to the regulated port through the passageway in the body, and a vent position in which fluid flows from the regulated port to the vent port through the passageway in the body;

the control stem having a mid-section with generally uniform diameter, having an upper flow slot on one end and a lower flow slot on the other end, the mid-section concurrently sealing against the supply seal assembly and the vent seal assembly to prevent fluid flow through the regulator when the control stem is in the closed position;

the control stem being moved laterally by rotation of the external adjustment knob, to disengage the upper flow slot in the control stem from the supply seal assembly which allows pressurized fluid to flow from the supply port to the regulated port when the control stem is in the open position;

the control stem being operatively connected to a sensor piston which is exposed to pressurized fluid in the regulated port to move the control stem laterally when fluid pressure in the regulated port exceeds the set pressure to disengage the lower flow slot in the control stem from the vent seal assembly to allow fluid to flow from the regulated port to the vent port, when the control stem is in the vent position.

* * * * *